Figure 1:
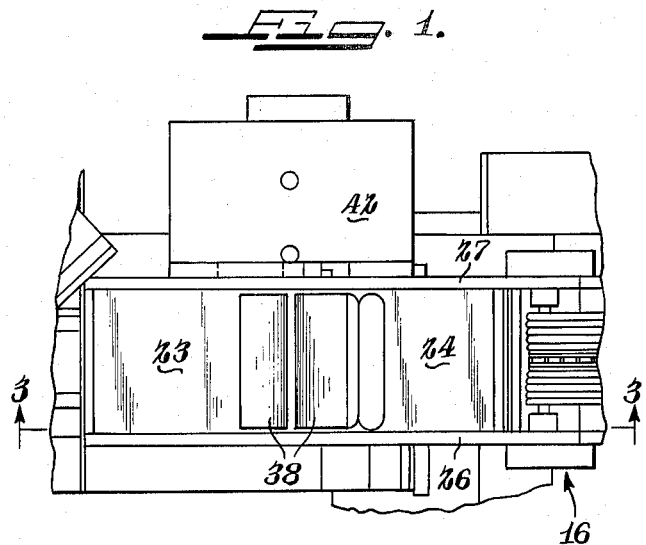

April 5, 1966 A. H. VEDVIK 3,244,320
HANDLING AND TRANSFER MECHANISM FOR SMALL ELONGATE ARTICLES
Filed Nov. 23, 1964 6 Sheets-Sheet 1

INVENTOR
ANDREW H. VEDVIK
BY
Greist, Lockwood, Greenawalt & Dewey
Attys.

April 5, 1966  A. H. VEDVIK  3,244,320
HANDLING AND TRANSFER MECHANISM FOR SMALL ELONGATE ARTICLES
Filed Nov. 23, 1964  6 Sheets-Sheet 3

INVENTOR.
ANDREW H. VEDVIK
BY
Greist, Lockwood, Greenawalt & Dewey
Attys.

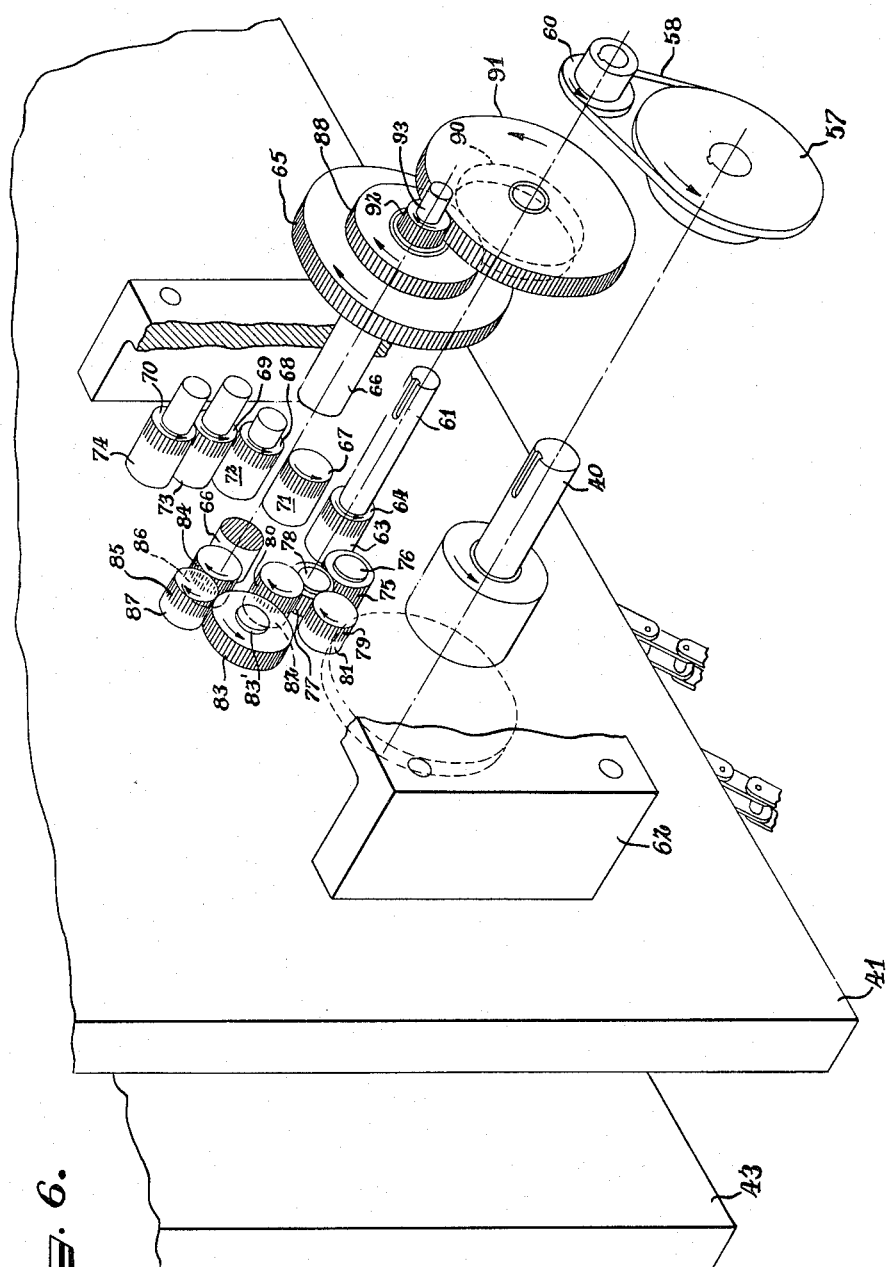

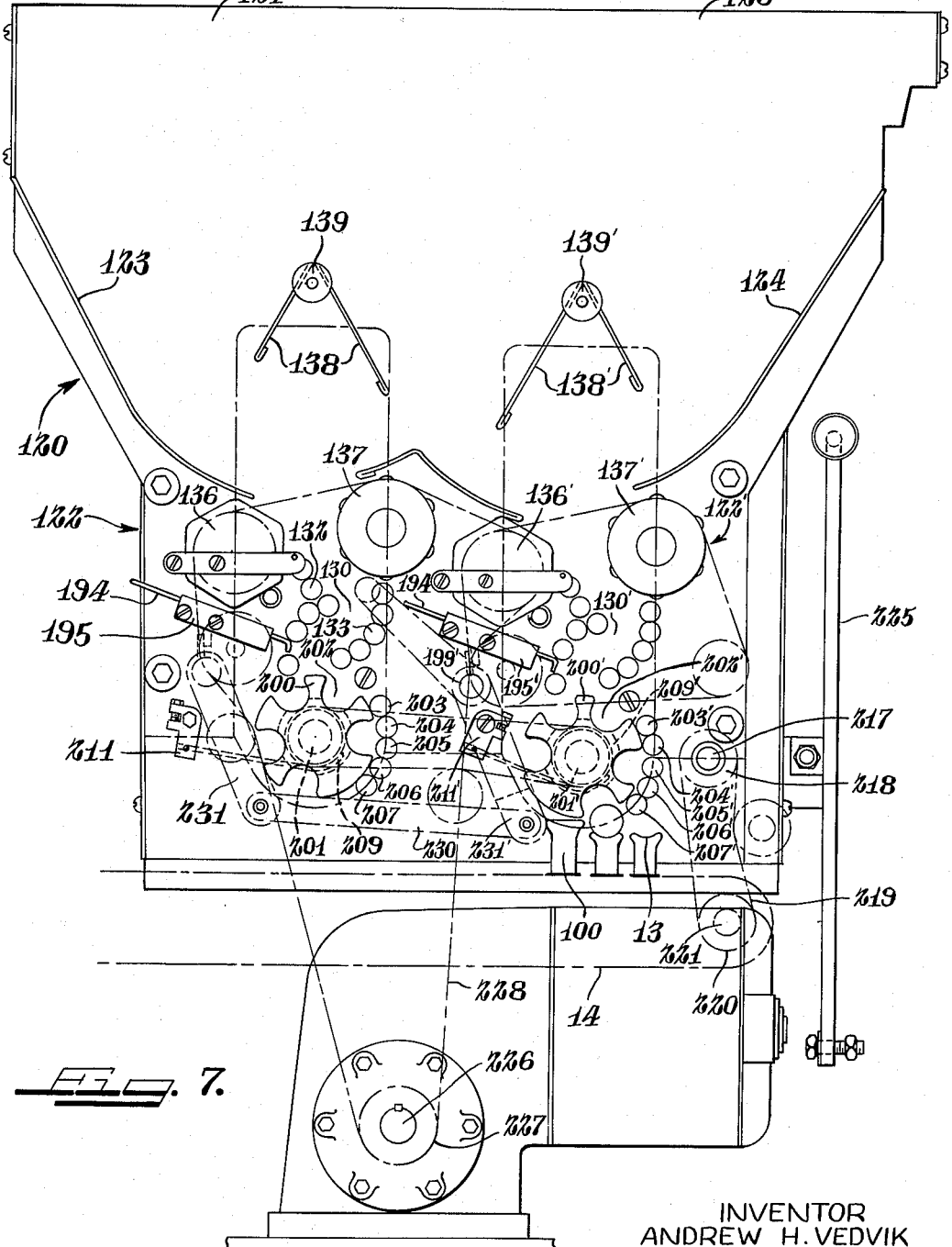

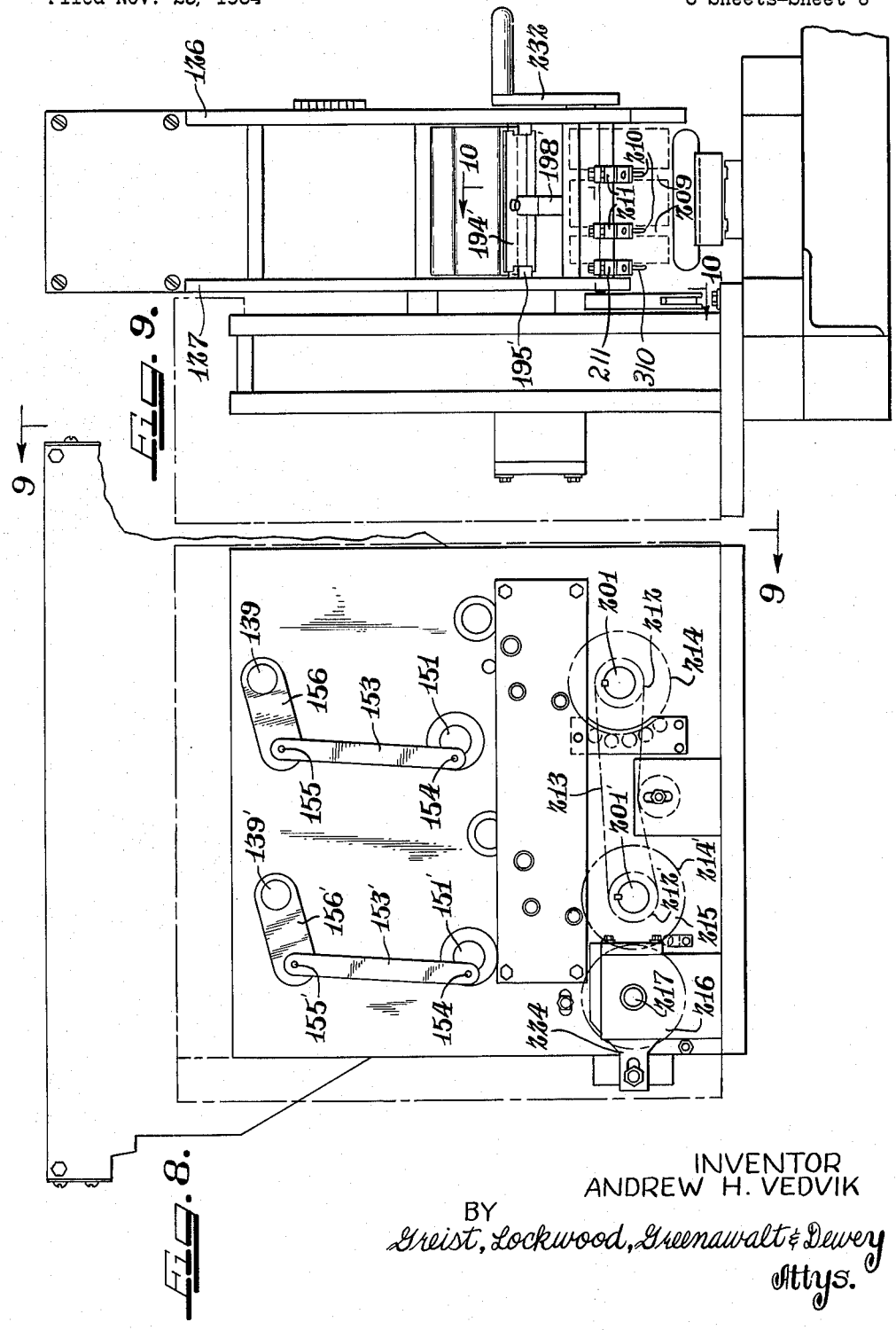

United States Patent Office 3,244,320
Patented Apr. 5, 1966

3,244,320
HANDLING AND TRANSFER MECHANISM FOR SMALL ELONGATE ARTICLES
Andrew H. Vedvik, Madison, Wis., assignor to Oscar Mayer & Co., Inc., Chicago, Ill., a corporation of Illinois
Filed Nov. 23, 1964, Ser. No. 413,239
9 Claims. (Cl. 221—124)

This application is a continuation-in-part of application Ser. No. 254,745, filed Jan. 29, 1963.

This invention relates to article handling equipment and is more particularly concerned with improvements in apparatus for receiving elongate, generally cylindrical articles which are advanced in the direction of their long axis and in one or more parallel lines and for passing the articles through an accumulator so as to facilitate arrangement of the articles for delivery to a wrapping machine or other handling equipment.

It is a general object of the invention to provide article handling apparatus for elongate cylindrical articles, such as sausages, which includes an accumulator to which the articles are delivered at an irregular rate and from which they are distributed in an orderly manner and at a uniform rate on a grouping conveyor for subsequent pick up in predetermined groups and/or quantities and advance to a packaging machine or the like.

It is a more specific object of the invention to provide in an apparatus for transporting and arranging articles, such as link sausages, wherein the sausages are received as they are advanced at a varying rate and delivered in predetermined groups to a packaging machine or the like, an accumulator device into which the sausages are fed at a random rate and from which they are discharged in an orderly manner and at a uniform rate onto a pocketed conveyor for subsequent pick up in groups of a predetermined number and delivery to a wrapping station where they are deposited in the arrangement and number required for forming uniform packages of the same.

A still more specific object of the invention is to provide apparatus for handling elongated cylindrical articles, for example, link sausages which have been freed from the casings in which they are processed, which apparatus includes an accumulator device comprising a hopper into which the sausages are delivered and a mechanism at the bottom of the hopper for delivering the sausages in an orderly manner into the pockets of a conveyor which advances the sausages in group formation so as to facilitate pick up and delivery to a wrapping machine.

It is another object of the invention to provide in an apparatus of the type described a sausage link accumulator which receives sausage links from a conveyor operating at a non-uniform delivery rate and maintains an accumulation of the links, with provision for feeding the links out of the accumulator and onto the grouping conveyor in a uniform manner, the accumulator having mechanism for arranging the links in side-by-side relation and depositing the same in pockets on the grouping conveyor, with the accumulator delivering a continuous stream of sausages so long as a supply thereof is maintained in the accumulator.

Figure 2:
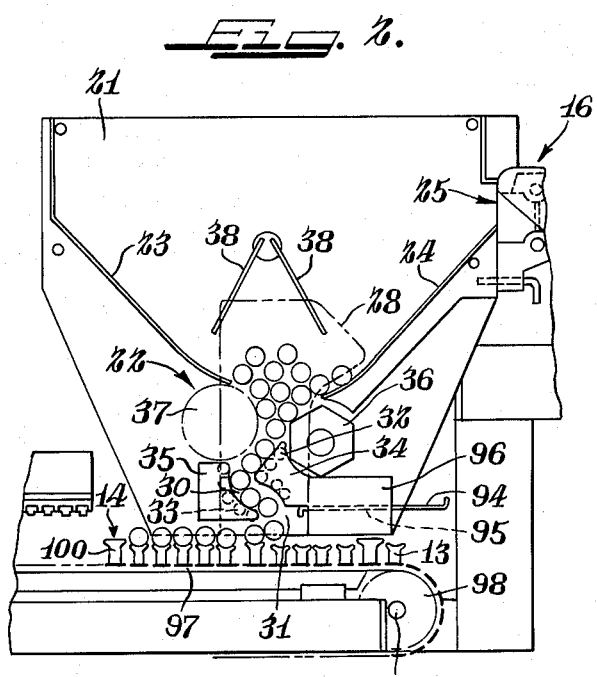
Figure 3:
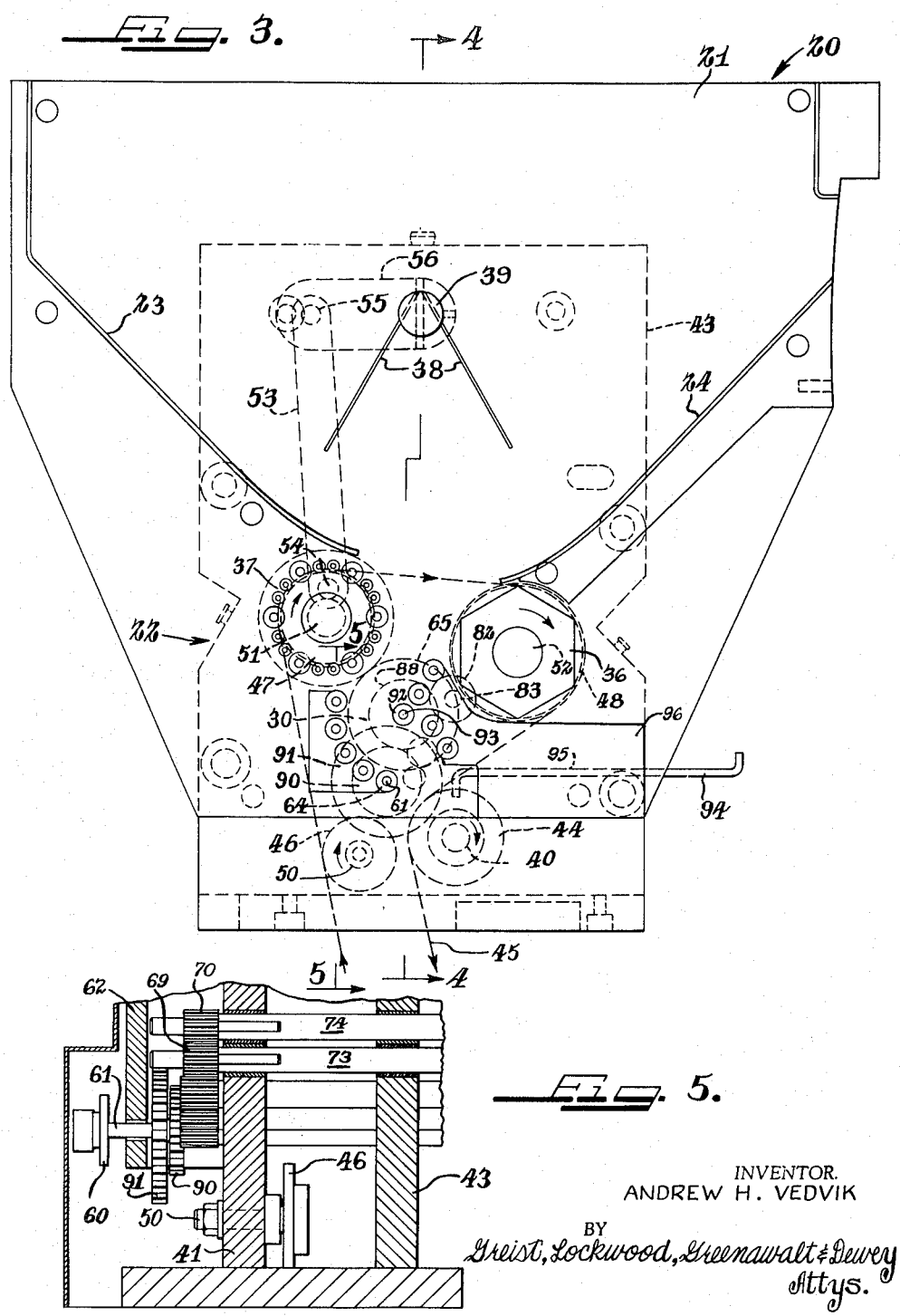
Figure 4:
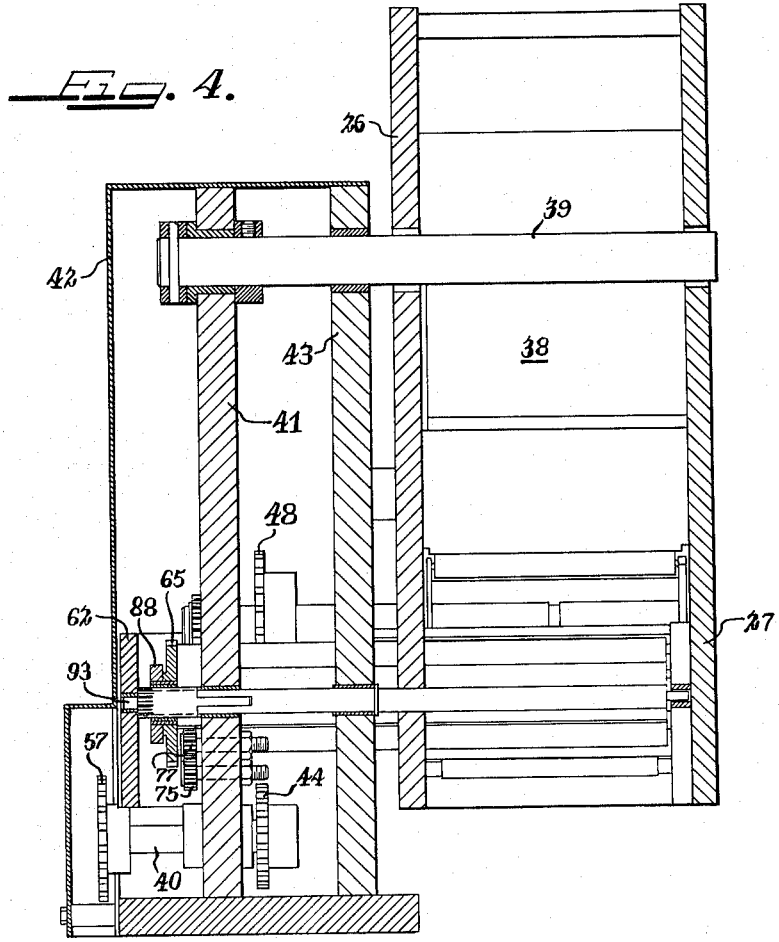
Figure 10:
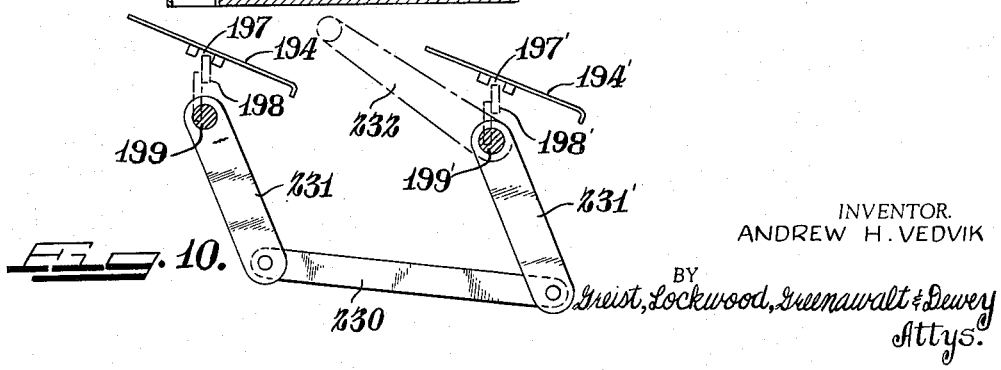

These and other objects and advantages of the invention will be apparent from a description of the apparatus which is shown by way of illustration in the accompanying drawings wherein:

FIGURE 1 is a side elevation of an accumulator device incorporated in an apparatus for transporting small sausages from processing equipment to a wrapping machine which accumulator device embodies therein the principles of the invention;

FIGURE 2 is a plan view of the apparatus shown in FIGURE 1;
FIGURE 3 is a section taken on the line 3—3 of FIGURE 2, to an enlarged scale;
FIGURE 4 is a vertical section taken on the line 4—4 of FIGURE 3;
FIGURE 5 is a fragmentary vertical section taken on the line 5—5 of FIGURE 3;
FIGURE 6 is a schematic view illustrating the driving arrangement for the accumulator device;
FIGURE 7 is an elevation similar to FIGURE 1 showing a modified form of the accumulator device, the view being to a larger scale;
FIGURE 8 is a rear elevation of the accumulator device of FIGURE 7;
FIGURE 9 is an elevational view taken on the line 9—9 of FIGURE 8; and
FIGURE 10 is a fragmentary section taken on the line 10—10 of FIGURE 9.

Referring to the drawings, the apparatus illustrated is especially designed for use in a sausage manufacturing or processing operation where link sausages are delivered to the apparatus from casing stripping mechanisms in a plurality of parallel paths with the individual sausages advancing in the direction of their long axes and in a non-uniform or miscellaneous array. The apparatus comprises sausage link receiving and transporting conveyors (not shown) which extend to an accumulator mechanism 20 (FIGURES 1 and 2) having a hopper 21 into which the sausages are delivered at a non-uniform rate, the delivery end of the conveyor which discharges into the hopper 21 is indicated at 16. A roller assembly 22 in the hopper 21 arranges the sausages in a single line and discharges the same in a constant stream through the bottom of the hopper 21. The sausages are deposited in groups of a predetermined number in pocket forming members 13 on the horizontally disposed top run of the conveyor 14 which advances the groups of sausages to a group transfer device (not shown) and thence to a wrapping machine (not shown).

The accumulator hopper 21 (FIGURES 1 to 6) has downwardly inclined converging end walls 23 and 24 with an opening 25 (FIGURE 1) at the top of the one end wall 24 to permit passage of the sausages S from the conveyor assembly 16 into the upwardly opening, generally V-shaped compartment formed between the hopper end walls 23 and 24 and the front and back side walls 26 and 27 thereof.

The accumulator hopper 21 has a width between the front and back side plates 26 and 27 which is slightly greater than the length of the sausages and the front side wall or plate 26 is preferably of transparent material so that the operator can observe the level of the sausages accumulating in the hopper. The hopper 21 is open at the top so that the sausages are accessible for the operator to manually relieve any jamming or crowding. The front wall 26 also has a hingedly mounted door 28 for the same purpose. The hopper end walls 23 and 24 slope downwards toward the bottom of the hopper with their bottom edges being spaced to permit flow of the sausages into a restricted passageway or channel 30 through which the sausages are guided in a single line for discharge from the hopper 21 through a bottom discharge opening 31 onto the conveyor 14 in side-by-side relation. The channel 30 is formed in part between two sets of driven rollers 32 and 33 which are rotatably mounted on two spaced support brackets 34 and 35 secured between the hopper side walls 26 and 27 so as to provide between the sets of rollers a curved lower passageway forming the lower portion of the channel 30 through which passageway the sausages must pass to reach the opening 31. The channel 30 extends above the roller assemblies 32 and 33 and between a relatively large revolving roller member 36 of hexagonal cross section and a roller assembly 37 which is in the form of a cylindrical cage with a plurality of freely rotating smaller rollers mounted about the periphery thereof. The roller assembly 37 is positioned to rotate on an axis above the roller assembly 33 with its periphery spaced from the upper portion of the roller assembly 32 so as to leave a passageway between the same for the sausages. The hexagonal roller 36 is positioned between the roller assembly 34 and the bottom edge of the hopper end wall 22 opposite the roller assembly 37. The roller 36 and roller assembly 37 operate to assist the sausages into the channel 30 and to break up any bridging of the sausages as they move down between the end walls 23 and 24 and into the entrance to the channel 30. Oscillating plates 38 are mounted in a downwardly opening inverted V arrangement on a supporting shaft 39 between the side walls 26 and 27 which break up jams, limit the flow of sausages to the discharge channel 30 and assist in keeping the sausages properly oriented in the hopper.

The individual rollers in the channel forming roller assemblies 32 and 33, the hexagonal roller 36 and the roller assembly 37 of the accumulator mechanism 20 are driven from power shaft 40 (FIGURES 3 to 6) which is journaled in an upstanding support plate 41 in a gear box 42, the front face of which is formed by an upstanding plate 43 disposed parallel with the plate 41 and spaced therefrom. The shaft 40 carries a sprocket 44 between the plates 41 and 43 which is connected by a chain 45 with the drive sprocket of a suitable drive motor (not shown). The drive chain 45 also engages in driving relation with sprockets 46, 47 and 48 (FIGURE 3). Chain tension sprocket 46 is secured on stub shaft 50 which is journaled in the support plate 41. The sprocket 47 is secured on shaft 51 which carries the cylindrical roller assembly 37 and the sprocket 48 is secured on the shaft 52 of the hexagonal roller 36. A vertically extending link bar 53 is eccentrically connected at its lower end by pivot 54 to the end of shaft 51 outside the back plate 41 in which the shaft 51 is journaled and at its upper end the link 53 is pivoted at 55 to the free end of a rocker arm 56 extending from the rock shaft 39 on which the agitator plates 38 are supported.

The drive shaft 40 has a sprocket 57 on its rear end which is connected by a chain 58 with a sprocket 60 carried on the shaft 61, which has its rear end journaled in a U-shaped bracket 62 secured on the back face of the support plate 41. The shaft 61 which extends through the support plates 41 and 43 and the back wall 27 of the hopper 21 carries the lowermost roll 63 of the roll assembly 33 and also a small gear 64 which is integral with the roll 63 and which engages in driving relation with the large gear 65, the latter being mounted for rotation in the same direction but a slower speed on the middle roller 66 of the roller assembly 32 and engaging in driving relation with gears 67, 68, 69 and 70 which are integral with rollers 71, 72, 73 and 74, respectively, of the roller assembly 33. The gear 64 also engages in driving relation with small intermediate gear 75 which is mounted on stub shaft 76 and which engages with another small intermediate gear 77 on a stud shaft 78. The intermediate gear engages in driving relation with gears 79 and 80 which are integral with the lowermost rollers 81 and 82 of the roller assembly 32. The gear 80 engages in driving relation with intermediate gear 83 which is mounted on stub shaft 83' and which engages in driving relation with gears 84 and 85, the latter being integral with the topmost rollers 86 and 87 of the roller assembly 32. The large gear 65 which is rotatably mounted on roller 66 has a smaller integral gear 88 which engages in driving relation with gear 90. Gear 90 is integral with larger gear 91 and both of these gears rotate on shaft 61 in the same direction but at a lower speed. The large gear 91 engages in driving relation with gear 92 which is integral with roller 66 carried on the shaft 93. The shaft 93 extends through bearing sleeves 94 in the support plates 41 and 43 and the end of the shaft 93 is journaled in the bracket 62. Extensions on the gears 69 and 70 abut against the bracket 62 to hold them in position axially. An extension on the gear 68 abuts against the back side of the gear 91 while gear 67 abuts against the back side of the gear 90. The gear 64 is retained on the shaft 61 by means of a snap ring behind the plate 41. Gears 80, 81, 84 and 85 abut against the back side of the gear 65. All of the small gears except 75, 77 and 83 are integral with rollers which extend through the support plates 41 and 43.

The hopper 21 has a manually operable slide 94 (FIGURE 3) mounted in a guide slot 95 in a supporting block member 96 at the base of the hopper which provides a gate for closing off the discharge opening 31 of the hopper to enable the operator to control the delivery of sausages to the conveyor 14.

The conveyor 14 which receives the sausages from the discharge opening 31 in the bottom of the accumulator hopper 21 comprises laterally spaced chains 97 supported on end sprockets 98 mounted on a cross shaft 99 and having upwardly opening, relatively shallow pocket forming members 13 which are arranged in parallel relation and in groups of a predetermined number with the groups separated by spacers 100. The upper run of the conveyor 14 is supported in a horizontal position on guide rails 101 with the trailing end of the conveyor traveling in a path beneath the hopper 21.

In using the apparatus of FIGURES 1 to 6, the link sausages S are delivered to the hopper 21 by the conveyor mechanism 16 at an irregular or random speed or rate of delivery. A quantity of the links are accumulated in the bin forming top portion of the hopper 21 for delivery out of the bottom thereof. The links are guided in single line by the rotating rollers which advance the links through the channel 30 and out of the discharge opening 31. The links leave the accumulator in a constant stream and are deposited in the pockets 13 on the constantly moving conveyor 14 which advances the links in group arrangement for pick up and delivery to a wrapping machine or other equipment. Since the links are delivered to the apparatus at an irregular rate, they do not necessarily reach the accumulator 20 in a constant stream. The operation of the accumulator is independently controlled so that the flow of sausages out of the same may be temporarily stopped by closing the slide 94 to allow a quantity of the links to accumulate in the bin forming portion of the hopper and to control the delivery of the sausages to the conveyor 14.

A modified accumulator device is illustrated in FIGURES 7 to 10 which is designed to speed up the operation by providing for delivery of two lines of the articles to the pockets 13 on the grouping conveyor 14. The accumulator mechanism 120 comprises a hopper 121 into which the sausages are delivered at a non-uniform rate and two roller assemblies 122 and 122' for arranging the sausages in two lines and feeding the same from the bottom of the hopper 121. The hopper 121 is formed by downwardly inclined, converging end walls 123 and 124 extending between the front and back side walls 126 and 127. The upwardly opening, generally V-shaped compartment formed between the upper portions of the side walls 126 and 127 has a width which is slightly greater than the length of the sausages and the front side wall or plate 126 is preferably of transparent material so that the operator can observe the sausage accumulation in the hopper. The hopper end walls 123 and 124 slope downwardly toward each other with spaced openings arranged in the bottom to permit flow of the sausages into two restricted passageways or channels 130 and 130' each defined by two sets of driven rollers 132, 133 and 132', 133'. The roller assemblies 132 and 133 are arranged in the same manner and supported and driven as described with reference to roller assemblies 32 and 33. Each roller assembly 132 has associated with it a hexagonal roller 136 which is a counterpart of roller 36 previously described while the roller assembly 133 has associated with it a roller assembly 137 which is a counterpart of roller assembly 37. The channels 130 and 130' open at the bottom above discharge rollers 200 and 200' which are mounted on transverse shafts 201, 201' (FIGURE 8) and these rollers 200, 200' are provided with a plurality of sausage accommodating pockets 202, 202' which are circumferentially spaced as shown so as to receive the sausages therein and deposit the same in the desired order corresponding to the spacing of the pockets 13 on the conveyor 14. Each pocketed roller 200, 200' has associated with it a series of driven rollers of small size 203, 204, 205, 206, 207 and 203', 204', 205', 206', 207' which are supported on the frames 208, 208' where they are arranged on a curve corresponding to the periphery of the pocketed roller so as to hold the sausages in the pockets 202, 202' as the rollers 200, 200' rotate and move the sausages from the bottom of the passageway 130 to deposit points above the pockets 13 on the grouping conveyor 14. Each of the rollers 200, 200' has two axially spaced circumferential grooves 209, 209' running beneath the pockets 202 and 202' in which are seated the curved ends of stripper wire or rod members 210 and 210'. Three of the stripper wires or fingers 210, 210' are mounted on pivoted brackets 211, 211' with the third one of these members 310, 310' having its curved end extending between the hub of the roller 200, 200' and the side plate 127. The stripper wires are positioned to insure that the sausages drop out of the pockets 202, 202' at the bottom of the roller paths.

The roller shafts 201 and 201' carry sprockets 212 and 212' (FIGURE 8) which are connected by a chain 213 so that the drive of the two shafts is synchronized. Each of the shafts 201 and 201' carries a gear 214 and 214' which engage in driving relation with gears (not shown) on the roller shafts for the rollers 203, 204, 205, 206, 207 and 203', 204', 205', 206', 207' so as to drive these members. The one shaft 201 carries a gear 215 which engages with a gear 216 on driven shaft 217. The shaft 217 carries a sprocket 218 (FIGURE 7) which is connected by chain 219 with a sprocket 220 on the driven transverse shaft 221 of the grouping conveyor 14 below the accumulator 120. The shaft 217 is provided with a clutch mechanism indicated at 224 (FIGURE 8) which is of conventional construction with a pivotally mounted operating arm 225 (FIGURE 7) at one side of the accumulator for disconnecting the drive so as to discontinue the operation of the pocketed rollers 200 and 200'. The drive motor unit 226 has an output sprocket 227 which is connected by the chain 228 with suitable sprockets (not shown) on the supporting shafts of the rollers and roller assemblies 136, 137 and 136', 137', the drive being arranged in a manner similar to that shown for accumulator 20 so as to move these rollers and roller assemblies in the proper direction for guiding the sausages into the passageways 130 and 130'.

Each of the roller assemblies 132 and 132' has associated with it a flow interrupting slide plate 194 and 194' (FIGURES 7, 9 and 10). The slide plates 194 and 194' are mounted in guideway forming brackets 195 and 195' so that an end thereof may be projected across the guideways 130 and 130' to cut off the flow of sausages out of the bottom of the passageways 130 and 130'. The slide plates 194 and 194' have pocket formations 197 and 197' for receiving the free ends of radially extending arms 198 and 198' on idler shafts 199 and 199'. The two idler shafts 199 and 199' are connected for simultaneous rotation by a link 230 pivotally connected to the free ends of depending arms 231 and 231' on the shafts 199 and 199'. The shaft 199' is extended beyond the front side plate 26 and provided with a lever 232 for manual operation by the machine attendant.

Oscillating plates 138 and 138' are mounted in the downwardly opening inverted V arrangement on supporting shafts 139 and 139' extending between the side walls 126 and 127 above the passageways 130 and 130' which break up jams, limit the flow of sausages to the passageways 130 and 130' and assist in keeping the sausages properly oriented in the hopper. The agitator plates 138 and 138' are oscillated in the same manner as the agitator plates 38 by vertically extending link bars 153 and 153' (FIGURE 8) which are eccentrically connected at their lower ends by pivots 154 and 154' to the ends of shafts 151 and 151'. At their upper ends the links 153 and 153' are pivoted at 155 and 155' to the free ends of rocker arms 156 and 156' extending from the rock shafts 139 and 139' on which the agitator plates 138 and 138' are supported.

In the operation of the accumulator device 120 the sausages are fed from the same in two lines. They descend in the passageways 130 and 130' and are delivered to the pockets of the star wheel-like rollers 200 and 200' which advance the individual sausages to a position above the pockets 13 in the conveyor 14 where they are deposited, the operation of the conveyor 14 being timed relative to the rotation of the wheels 200 and 200' to receive the sausages as they drop out of the pockets 202 and 202' into the conveyor pockets 13 where they are arranged in groups of the desired number according to the spacing of the pockets 202 and 202'. Each of the star wheels 200 and 200' deposits sausages in every other pocket 13 on the conveyor 14 and the separate star wheels deliver sausages into alternate pockets 13, that is, star wheel 200' delivers sausages into every other pocket 13 while star wheel 200 delivers sausages into the pockets 13 which are skipped by star wheel 200'. The rate of delivery of sausages to the conveyor 14 by the star wheels 200 and 200' is limited by the rate of acceleration of the sausages, due to gravity and the urging of the rollers 132, 133 and 132', 133' as the sausages descend in the passageways 130 and 130', the star wheels 200 and 200' being adapted to be rotated so as to receive the sausages in the pockets 202 and 202' as fast as they descend in the passageways 130 and 130' and to hand the sausages down to the conveyor pockets 13. Consequently, the two line accumulator 120 permits operation of the conveyor 14 at twice the speed which is possible with the single line accumulator 20.

I claim:

1. Apparatus for accumulating elongate articles having the form of small sausages and for dispensing the articles in a continuous stream, which comprises a hopper having front and back walls spaced to accommodate the articles when they are positioned therein in side-by-side relation and with their long axes normal thereto, inclined end walls in the upper portion of said hopper which converge toward a restricted bottom opening so as to form an accumulator bin for receiving the articles which are delivered thereto through a top opening, a plurality of rollers mounted in closely spaced relation in two spaced lines below said bottom opening and the rollers in one line being spaced relative to the rollers in the oppositely disposed line so as to provide a passageway for a single line of the articles which passageway has upper and lower portions in angular relation and which terminates at a discharge opening at the bottom of the hopper, and power means for driving certain of said rollers in each line thereof so as to advance the articles through the passageway in a continuous stream.

2. Apparatus as recited in claim 1, and a pair of the rollers which are adjacent the bottom opening of the accumulator bin being relatively large with one of said large rollers being hexagonal in cross section and the other large roller comprising a cylindrical roller cage and a plurality of small freely rotating rollers mounted about the periphery thereof, and said large rollers being spaced apart a distance greater than the thickness of a single article and being operable to advance the articles into the passageway in single row relation.

3. An accumulator and dispenser device for elongate articles having the form of small sausages, which device comprises a hopper having generally parallel, vertically disposed front and back walls spaced to accommodate the articles when they are positioned in side-by-side relation and with their long axes extending between said front and back walls, inclined side wall forming members which converge toward a pair of spaced bottom openings so as to form between said front walls an accumulator bin for receiving a supply of the articles and for feeding the articles through said bottom openings, a plurality of rollers mounted to extend between said front and back walls below each of said bottom openings, said rollers being arranged in downwardly extending, oppositely disposed lines and spaced so as to provide a relatively narrow passageway, the rollers at the entrance to said passageway being spaced apart a greater distance than the thickness of an article and the succeeding rollers in each line along the passageway being spaced a lesser distance from the oppositely disposed rollers so as to guide the articles into a single line for discharge from the bottom end of the passageway, a pocketed roller mounted at the bottom end of each passageway, means to rotate said rollers so as to receive the articles in successive pockets as they are discharged from the bottom ends of the passageways and to deposit the articles in timed relation on a conveyor traveling beneath the same, and power means for driving the rollers so as to advance the articles through each of the passageways in a continuous stream for delivery to said pocketed rollers.

4. An accumulator and dispenser device for elongate articles having the form of small sausages, which device comprises a hopper having generally parallel, vertically disposed front and back walls spaced to accommodate the articles when they are positioned in side-by-side relation and with their long axes extending between said front and back walls, inclined side wall forming members which converge toward a pair of spaced bottom openings so as to form between said front walls an accumulator bin for receiving a supply of the articles with bottom discharge openings for two lines of the articles, a plurality of rollers mounted to extend between said front and back walls and below each of said bottom discharge openings, the rollers disposed below each of said openings being arranged in oppositely disposed lines so as to provide a relatively narrow passageway for the articles with the passageway having portions at angles to each other, the rollers at the entrance to said passageway being spaced apart a greater distance than the thickness of an article and the succeeding rollers in each line along the passageway being spaced from the rollers disposed opposite thereto in the other line a lesser distance so as to guide the articles into a single line for passage through an opening at the bottom end of the passageway, a roller having peripherally spaced pockets mounted at the bottom end of the passageway for receiving the articles one by one and for depositing successive articles in predetermined order beneath the same, power means for driving the rollers continuously so as to urge the articles downwardly through the passageways and into the pocketed rollers thereby to provide for delivery of the articles in two continuous streams.

5. An accumulator and dispenser device as recited in claim 4, and said bottom roller having pockets arranged in groups with the pockets of each group closely spaced and each group separated from the adjacent groups by a distance greater than the spacing between the pockets in the groups.

6. An accumulator and dispenser device as recited in claim 4, and slidably mounted plate members at the bottom of each of said passageways which form gate members and which are adapted to be moved into the passageways to stop the flow of articles therethrough.

7. An accumulator and dispensing device for elongate articles having the general form of small sausages, said device comprising a hopper having front and back walls spaced apart a sufficient distance to accommodate the articles when they are received in the hopper in side-by-side relation and with their long axes in a direction normal to said walls, end walls in the upper portion of said hopper which are inclined toward a restricted bottom opening so as to form an accumulator bin for articles which are delivered thereto, a plurality of rollers mounted in closely spaced relation between said front and back walls below said bottom opening which rollers are arranged in two oppositely disposed lines to define a downwardly extending passageway having angularly related sections for advancing articles in a single line which terminates at a discharge opening adjacent the bottom of the hopper, a roller mounted below said discharge opening and having peripherally spaced pockets for receiving the articles one by one at the bottom of the passageway and for depositing successive articles in timed relation beneath the hopper, and power means for driving said rollers in a direction to advance the articles through the passageway in a continuous stream and at a uniform rate.

8. An accumulator and dispensing device for elongate articles having the form of small sausages, said device comprising a hopper having front and back walls spaced apart a sufficient distance to accommodate the articles when they are received in the hopper in side-by-side relation and with their long axes normal to said walls, end walls in the hopper which are inclined toward a restricted bottom opening so as to form an accumulator bin for articles which are delivered thereto, a plurality of rollers mounted between said front and back walls below said bottom opening which rollers are closely spaced in two lines so as to define a passageway between said two lines for advancing the articles and restricting them to a single line for discharge through an opening at the bottom of the hopper, a roller having peripherally spaced, parallel pockets for receiving the articles at the bottom of the passageway in side-by-side relation and for depositing the articles in timed relation in a conveyor beneath the hopper, and power means for driving the two lines of said rollers so as to advance the articles downwardly through the passageway in a continuous stream and at a uniform rate.

9. An accumulator and dispenser device for elongate articles having the form of small sausages, which device comprises a hopper having generally parallel, vertically disposed front and back walls spaced to accommodate the articles when they are positioned in side-by-side relation and with their long axes extending between said front and back walls, inclined side wall forming members which converge toward a pair of spaced bottom openings so as to form between said front walls an accumulator bin for receiving a supply of the articles with bottom discharge openings for two lines of the articles, a plurality of rollers mounted to extend between said front and back walls and below each of said bottom discharge openings, the rollers disposed below each of said openings being arranged in oppositely disposed lines so as to provide a relatively narrow passageway for the articles, the rollers at the entrance to said passageway being spaced apart a greater distance than the thickness of an article and the succeeding rollers along the passageway being spaced to guide the articles into a single line for passage through an opening at the bottom end of the passageway, a roller having peripherally spaced pockets mounted at the bottom end of the passageway for receiving the articles one by one and for depositing successive articles in predetermined order beneath the same, power means for driving the rollers so as to urge the articles downwardly through the passageways and into the pocketed rollers so as to provide for delivery of the articles in two continuous streams, plate members mounted in guideways adjacent the bottom of each of said passageways which are movable into the passageways to block the flow of articles out of the passageways, and means extending between the two plate members for effecting simultaneous movement of said plate members into and out of said passageways.

References Cited by the Examiner

UNITED STATES PATENTS

| | | | |
|---|---|---|---|
| 884,186 | 4/1908 | Meredith | 221—200 |
| 1,099,705 | 6/1914 | Kolb | 221—201 |
| 1,435,743 | 11/1922 | Salfisberg | 221—200 |
| 1,906,098 | 4/1933 | Pullen et al. | 221—202 |
| 2,295,469 | 9/1942 | Hall et al. | 221—201 |
| 2,480,897 | 9/1949 | Bettendorf | 221—201 |
| 2,550,616 | 4/1951 | Stephano | 221—183 |
| 2,634,022 | 4/1953 | Wyatt | 221—200 |
| 2,696,327 | 12/1954 | Woodruff | 221—201 |
| 2,744,616 | 5/1956 | Shields | 198—127 |
| 2,902,186 | 9/1959 | Pollmann | 221—200 |
| 2,913,098 | 11/1959 | Zellinsky et al. | 221—201 |
| 2,918,197 | 12/1959 | Ritscher et al. | 221—183 |
| 2,924,356 | 2/1960 | Pollmann et al. | 221—201 |

LOUIS J. DEMBO, *Primary Examiner.*

RAPHAEL M. LUPO, *Examiner.*